(12) United States Patent
Stamatescu et al.

(10) Patent No.: US 7,310,586 B2
(45) Date of Patent: Dec. 18, 2007

(54) METAL DETECTOR WITH DATA TRANSFER

(75) Inventors: Laurentiu Stamatescu, Rostrevor (AU); Alexander Lewis Jones, West Croydon (AU)

(73) Assignee: Minelab Electronics Pty Ltd, South Australia (AU)

( * ) Notice: Subject to any disclaimer, the term of this patent is extended or adjusted under 35 U.S.C. 154(b) by 105 days.

(21) Appl. No.: 10/927,214

(22) Filed: Aug. 25, 2004

(65) Prior Publication Data

US 2005/0062476 A1    Mar. 24, 2005

(51) Int. Cl.
*G01R 35/00* (2006.01)
*G01V 3/08* (2006.01)

(52) U.S. Cl. ..................... 702/107; 324/326

(58) Field of Classification Search ............... 702/107, 702/38, 116; 324/326, 327, 329; 340/551
See application file for complete search history.

(56) References Cited

U.S. PATENT DOCUMENTS

| | | | | |
|---|---|---|---|---|
| 4,507,612 A * | 3/1985 | Payne | ........................ | 324/329 |
| 4,709,213 A * | 11/1987 | Podhrasky | .................. | 324/329 |
| 4,868,910 A * | 9/1989 | Maulding | ................... | 324/233 |
| 5,138,262 A * | 8/1992 | Podhrasky et al. | ......... | 324/327 |
| 5,148,151 A * | 9/1992 | Podhrasky | .................. | 324/329 |
| 5,644,236 A * | 7/1997 | Strosser et al. | ............. | 324/326 |
| 5,680,048 A * | 10/1997 | Wollny | ....................... | 324/329 |
| 5,696,490 A * | 12/1997 | Maloney | ..................... | 340/555 |
| 5,721,489 A * | 2/1998 | Weaver et al. | ............... | 324/329 |
| 5,786,696 A * | 7/1998 | Weaver et al. | ............... | 324/329 |
| 6,690,169 B2 * | 2/2004 | Candy | ......................... | 324/329 |
| 6,911,823 B2 * | 6/2005 | Rowan | ....................... | 324/326 |
| 2002/0163346 A1 * | 11/2002 | Arndt et al. | ................. | 324/639 |
| 2006/0284758 A1 * | 12/2006 | Stilwell et al. | ............... | 342/22 |

OTHER PUBLICATIONS

Zoubir et al., Signal Processing Techniques for Landmine Detection Using Impluse Ground Penetrating Radar, Feb. 2002, IEEE Sensors Journal, vol. 2, No. 1, pp. 41-51.*

Chant et al., Overview of Current Radar land Mine Detection Research at the Defence Science and Technology Organisation, Salisbury, South Australia, Oct. 7-9, 1996, Conference Publication No. 431, pp. 138-412.*

* cited by examiner

*Primary Examiner*—John Barlow
*Assistant Examiner*—Toan M. Le
(74) *Attorney, Agent, or Firm*—Craig A. Fieschko, Esq.; DeWitt Ross & Stevens S.C.

(57) ABSTRACT

A metal detector adapted to generate a transmit search signal and to receive a receive search signal, and to analyse such received search signal, wherein the detector is adapted to allow a selection of operating parameters for each of these functions, said selection being effected by the storage as data in a memory of such selection, characterised in that the detector is adapted to allow such stored data to be modified in accordance with data in an external store, further characterised in that there is a digital data communication transmission program, adapted to effect a transmission of some or all of the stored data through a data transmission means to enable a further metal detector to receive and store for use in such further detector the said data.

17 Claims, 4 Drawing Sheets

METAL DETECTOR WITH DATA TRANSFER

FIELD OF THE INVENTION

This invention relates to a metal detector with means to electronically store data including parameters affecting its performance in detecting specific types of targets in specific environments.

BACKGROUND OF THE INVENTION

The detection of metal targets in natural terrain, with a hand-held metal detector, is a skill that takes time and practice for an operator to develop. A modern detector, especially a more advanced type, has many parameters that can be altered by its operator with a view to maximizing the sensitivity of the detector in a particular environment. All operators want their detector to be as sensitive as possible to targets that they want to find, while being insensitive to those targets that the operator has no desire to disinter; less desirable targets are often referred to as "trash". It is through the provision of means of varying the parameters that design of the modern detector seeks to enable those who are less skilled in the art of detecting to be successful in finding desirable targets, regardless of their lesser skill.

Although such a detector can turn the less skilled into successful operators, it does mean that they must acquire skill in the manner of setting the parameters of their detectors; the gain of less effort and skill in one art comes at the price of having to acquire some skill in another, that of setting up the detector.

A further problem is that the nature of the predominant "trash" may change from one environment to another. The nature of the desired target may also change. With currently available art, an operator is required to own several complete detectors to enjoy the advantage of having maximal sensitivity to disparate targets n different environments. The patterns of transmissions of the transmitter and the patterns of demodulation affect the type of targets to which the detector will be most sensitive and least sensitive.

SUMMARY OF THE INVENTION

It is an object of this invention to provide a method and apparatus to reduce the problems of the prior art.

Accordingly there is provided a metal detector which, through means of electronic communication with external data sources, reduces the amount of skill required to be a successful operator of such a metal detector.

There is provided a metal detector which allows sets of values of detecting parameters stored in a metal detector to be modified according to the data in an external data store.

In preference, the metal detector is adapted to generate a transmit search signal and to receive a receive search signal, and to analyse such received search signal, wherein the detector is adapted to allow a selection of operating parameters for each of these functions, said selection being effected by the storage as data in a memory of such selection, characterised in that the detector is adapted to allow such stored data to be modified in accordance with data I an external store.

In preference, there is a digital data communication transmission program, adapted to effect a transmission of some or all of the stored data through a data transmission means to enable a further metal detector to receive and store for use in such further detector the said data.

In a further form it is proposed that there is a metal detector which allows sets of values of detecting parameters to be transferred between the data stores in two such detectors.

This is an advantage for operators who would like to share, with fellow operators, the sets of parameters that they have developed.

In a further form it is proposed that there is a metal detector wherein the operator will be able to choose which of several available sets of transmission and demodulation patterns will be stored within the detector at any time.

In a further form of the invention it is proposed that there be provided a metal detector wherein a set of stored instructions or software can be replaced, either wholly or partially. This has the advantage that the metal detector can have its operation upgraded or altered without resort to the purchase of new hardware.

In a further form of the invention, it can be said to reside in a metal detector including means adapted to generate a transmit search signal and means adapted to receive and analyse any received search signal, characterised in that the detector includes means to effect a selection of characteristics of the transmit search signal or of the received signal and there are means to record and store as data in a memory such selection and any selected range, wherein there is a digital data communication transmission program, and means to activate said communication transmission program to effect a transmission of some or all of the stored data through a data transmission means to enable a further metal detector to receive and record for use in such further detector the said data.

Parameters affecting the performance of a metal detector which may advantageously be modified by a user include the transmit pattern, which describes the variation of the transmitted search signal with time. The demodulation pattern describes the variation with time of the sampling of the signal on a receive coil with time, to generate a receive search signal.

A digital signal processing pattern describes the filters and coefficients of those filters which are employed in a digital signal processing step applied to the receive search signal.

In preference, the characteristics able to be selected include at least one of the following;
the power spectrum of the transmit signal, at least one range of amplitude of a conductance component of a receive signal, at least one range of amplitude of an inductive component of a receive signal.

In preference there are included means to receive said data and effect location of data in memory, including means to select such data settings for an operating mode of the metal detector.

In preference the metal detector includes means to manually set and to record settings defining both at least one range of conductance and at least one range of reactance and record such setting range or ranges as a defined set.

In preference the operating parameters able to be selected include a discrimination pattern, said discrimination pattern including at least one range of amplitude of a conductance component of a receive search signal and at least one range of amplitude of an inductive component of a receive search signal.

In preference the operating parameters able to be selected include an information set indicating the values of any or all user modifiable settings of the detector.

In a further form of the invention it may be said to reside in a method for operating a metal detector of a type including the facility to select values of search parameters and to store such values as data including the steps of effecting the receipt by electronic transfer means of data being a set of values of search parameters effecting the storage of such data in a memory means, effecting the modification of the search parameters of the detector according to the values carried by said data.

In preference, the data are received from another detector of the same or similar type.

In preference, in the alternative, the data are received from a computer.

In preference, the computer receives the data by download from a remote computer system by way of a network of computers.

In a further form of the invention it may be said to reside in a set of two metal detectors of a type including the facility to select values of search parameters and to store such values as data including a first metal detector adapted to store data values representing parameters used to determine a search strategy used by said first detector to maximise the likelihood of detection of a selected target into a memory means, and to effect the transfer of said data over an electronic data transfer means, and a second metal detector adapted to receive data over an electronic detection means, and to store said data into a memory means, further adapted to use said data to effect a search strategy to maximise the likelihood of detection of the same selected target.

BRIEF DESCRIPTION OF THE DRAWINGS

For a better understanding of this invention it will now be described with reference to a preferred embodiment with reference to drawings in which.

DESCRIPTION OF THE PREFERRED EMBODIMENTS

Figure 1:
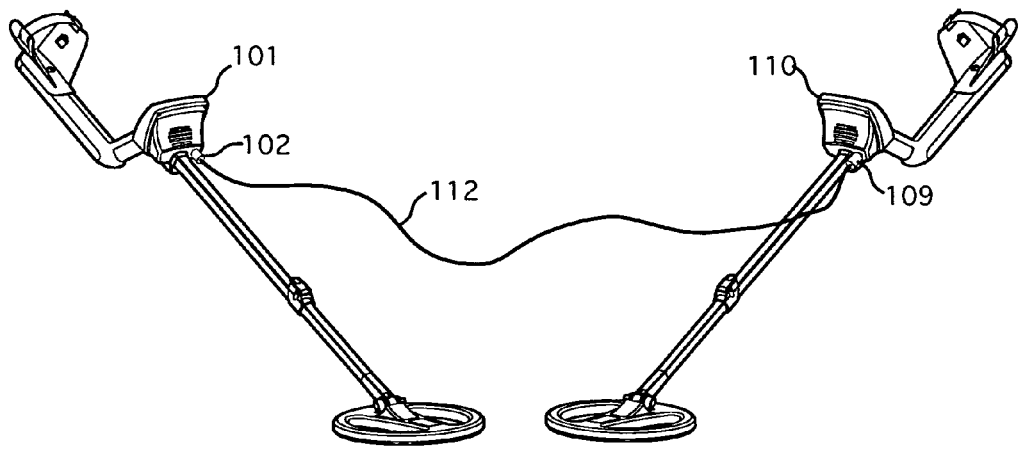
FIG. 1 is a block diagram showing the communication of parameters between two detectors made in accordance with the invention.

With reference to FIG. 1, a first detector 101 is connected to a second detector 110. Connecting them is a cable 112 capable of conducting electrical signals. An end of the cable is plugged into a communications port 102 of the first detector, while the another end of the cable is plugged into a communications port 109 of the second detector. The first detector can request and receive a set of operational parameters from the second detector. When received, the received parameter data can be stored in non-volatile memory.

Transmit patterns, and demodulation patterns, can be stored in the detector in a this manner. The timings of the transmitter and the demodulation windows affect the type of targets to which the detector will be most sensitive and least sensitive. With currently available art, an operator is required to own several complete detectors to enjoy the advantage of having maximal sensitivity to disparate targets.

The operating software can be upgraded through connection of the detector to a computer that has copies of different versions of some software modules. Not only can separate modules of operating software be replaced, but it is also possible to receive a new set of operational parameters from a computer, in the same way as from another detector.

Figure 2:
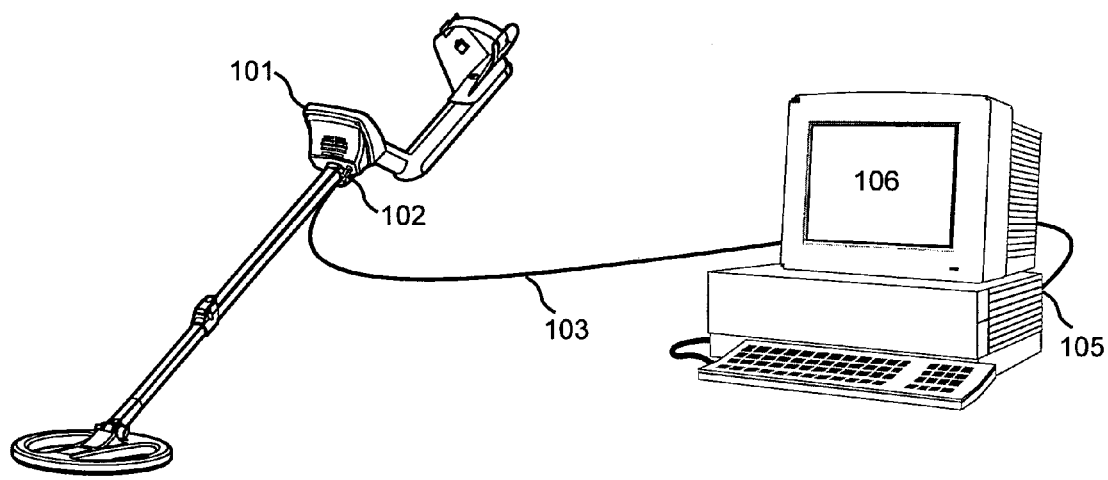
FIG. 2 shows an arrangement for performing an upgrade of the software of a detector made in accordance with the invention.

An arrangement for performing an upgrade of the software of the detector, or for receiving a new set of operational parameters is depicted in FIG. 2. The detector 101 is connected to a computer 106 through a connection 106, the connection being plugged into the communications port 102 on the detector and a communications port 105 on the computer 106. The operator controls this procedure by manipulating controls on the computer.

When connecting to another detector or to a computer, in alternative embodiments, cabled connections or digital pulses of light or RF, transmitted without benefit of a cable, may be the means of connection.

Figure 4:
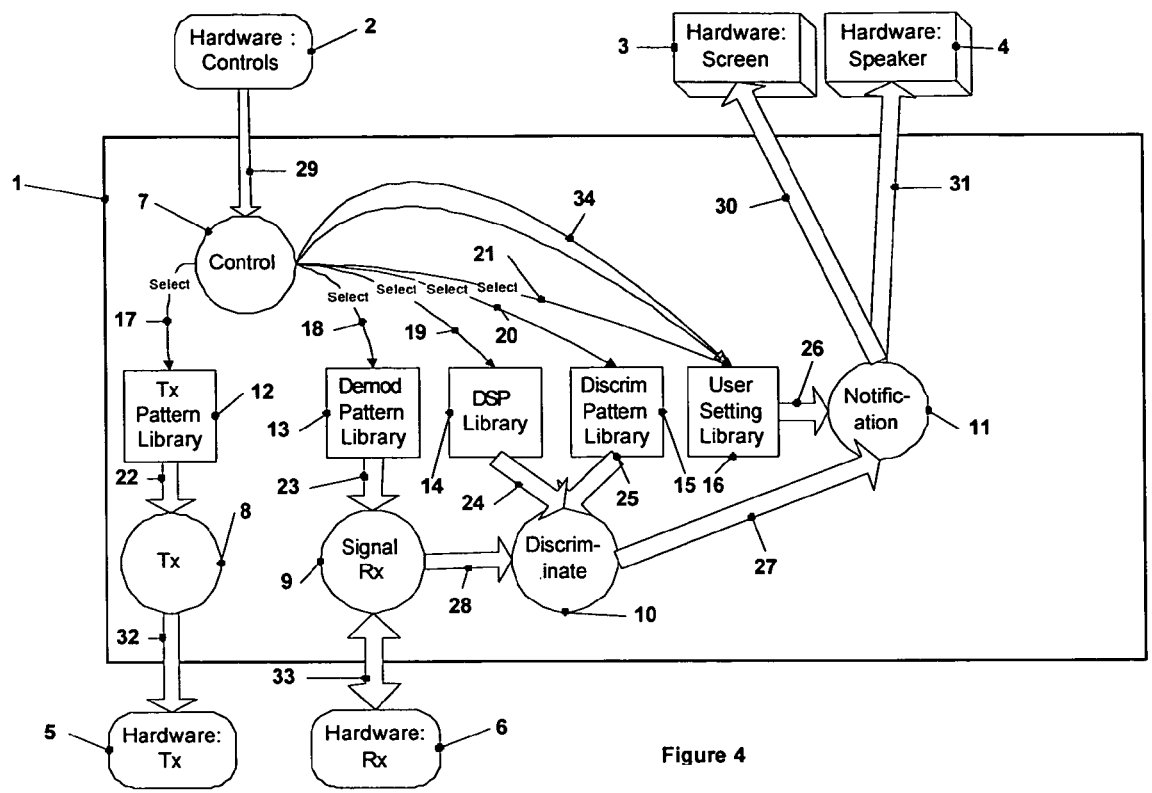
FIG. 4 shows a block diagram of a detector showing the data flows for setting and using the operational parameters of a detector made in accordance with the invention.

In order to facilitate the transfer and storage of data, the operating detector includes an electronic facility for storing sequences of digital data such that the pattern of the digital data within the facility will be retained even when electrical power is no longer provided to the facility. There is also a means of recalling elements of the data in a pre-determined order. There is also a means for storing additional data, or for replacing previously recorded data with newly delivered data. FIG. 4 shows a block diagram of a detector with these features.

Controls 2 are switches and potentiometers that can be manipulated by an operator in order to affect the manner in which the detector responds to targets. These are connected, via control lines 29, to the microprocessor block 1 and are interpreted by the Control Process 7, which responds to the settings of the controls 2 by selecting which sets of the libraries of parameters are used by other processes when they run.

The operator can be notified of events, such as the detection of a desirable target, through two sets of hardware simultaneously. One is the Speaker and its associated amplifiers 4, while the other is a Screen 3 for presenting visual images. What is emitted by them is set by the Notification Process 11 via a first notification line 30 and a second notification line 31.

Transmitting hardware 5 including a transmitting coil and associated hardware transmits a changing magnetic field that induces eddy currents in conductive objects within its region of influence. The manner in which the current in the transmitting coil, and therefore the intensity of the transmitted field, changes with time is controlled from within the microprocessor through the Transmit Process 8, using whichever of a set of Transmit Patterns is selected from a Transmit Pattern Library 12 by the Control Process via a Transmit Selection Datum 17. The selected Transmit Pattern is read by the Transmit Process via a Transmit data channel 22 and that pattern is conveyed to the transmitting hardware via Transmit lines 32.

A Receive coil and its associated Receive electronics 6 amplify and convert electrical signals induced in the Receive coil by the disturbances in the transmitted magnetic field by electrically conductive or magnetic objects within the region of influence of the transmitted magnetic field. After amplifying the electrical signals from the Receive coil, samples of the amplified electrical signals are taken at different times and accumulated in a plurality of integrators to produce a plurality of analogue signal channels. When and over what periods the samples are taken are determined by whichever Demodulation Pattern is selected from a set of Demodulation Patterns, stored within a Demod Pattern Library 13, to be used by a Signal Receive Process 9. The Control Process uses the Receive Selection Datum 18 to select a current Demodulation Pattern. A Receive Pattern Transfer 23 sends the current Demodulation Pattern to the Signal Receive Process. A signal path 33 connects the microprocessor and the Receive electronics. This path also carries information to the Receive electronics, namely the current Demodulation Pattern, along with digital signals used to control an ADC for converting the analogue signal channels to digital numbers that can be sent to and interpreted by the Signal Receive Process.

Data from the analogue signal channels are transformed by the Signal Receive Process and sent to a Discriminate Process 10 via a Signal Receive data channel 28. Digital Signal Processing (DSP) is applied to the data sent to the Discriminate Process. The type of filters used can be selected through the Control Process selecting filters and their coefficients from a DSP Library 14 via a DSP Selection Datum 19. The current selection from that library is sent to the Discriminate Process along a DSP data channel 24.

Also affecting the behaviour of the Discriminate Process is a Discriminate Pattern. A current Discriminate Pattern is selected from a set of Discriminate Patterns, stored in a Discrim Pattern Library 15, by the Control Process via the Discrim Selection Datum 20. Parameters of the current Discriminate Pattern are transmitted to the Discriminate Process via the Discriminate Pattern data channel 25.

Results of the calculations performed by the Discriminate Process are transferred, via a Discriminate data channel 27, to a Notification Process 11. The Notification Process uses the results of the Discriminate Process to produce emission codes that can be used by the Screen and the Speaker to produce signals to be interpreted by the operator. The Notification Process also uses a current User Setting, as selected from a set of User Settings stored in a User Setting Library, by the Control Process via the User Setting Select Datum 21, to affect the way in which the Notification Process transforms the results from the Discriminate data channel to produce the emission codes. Each User Setting is a set of parameters that, in part, determine the functions that produce the emission codes from the results of the Discriminate Process.

Even though a particular User Setting might be selected from the User Setting Library, the Controls can be manipulated by the operator, while the detector is operating, in order to induce the Control Process to change one or more of the parameters of the current User Setting. Such changes are transferred to the current User Setting via a User Setting Alteration data channel 34. It is possible for the operator to have any altered values of parameters for the Notification Process saved in the data storage instead of their original values, or to have the altered set of parameters saved as a new member of the User Setting Library.

The Notification Process determines the emission codes to be sent to the Screen and the Speaker, via the first and second notification lines.

The Discrim Pattern Library is associated with a system of discrimination unique among metal detectors. Although it is proven to be an excellent tool for discrimination between targets, it can take some time and effort to create a discrimination pattern suitable for a particular environment. The ability to transfer members of this library to other like detectors is, therefore, of particular benefit.

In the Discriminate Process, the incoming data are processed and, for each set, a pair of numbers is produced which is an indication of the conductivity and "inductivity" of any target within the region of influence of the Transmit hardware. This pair of numbers can be treated as the coordinates of a point on a two-dimensional graph.

The Notification Process can be directed, through the Control Process, to cause a display of the two-dimensional graph upon the Screen with a marker indicating, through its position within the area of the graph, values of the coordinate pairs generated for a target by the Discriminate Process. An example of such a screen is illustrated in FIG. 3.

Figure 3:
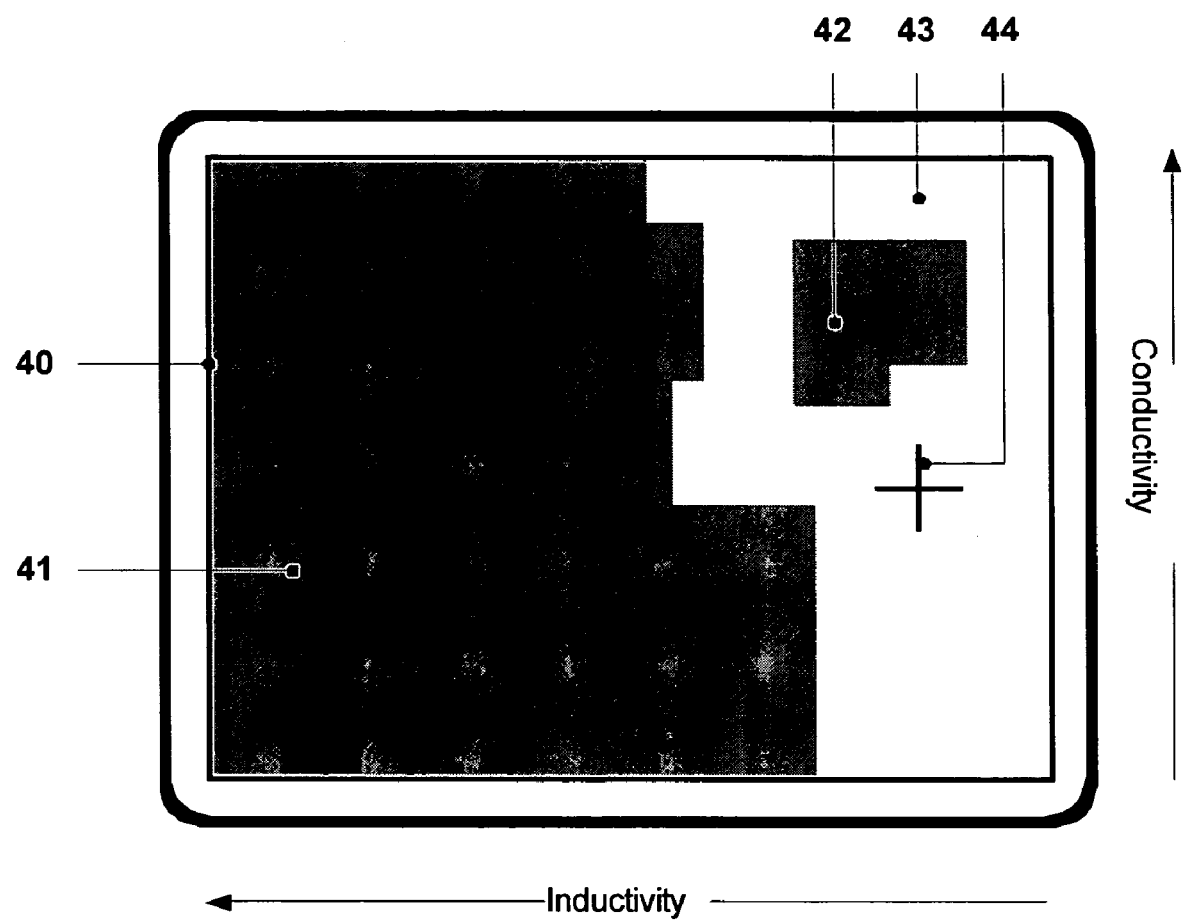
FIG. 3 shows a representation of a screen showing a discrimination pattern display as may be part of a detector made in accordance with the invention.

In FIG. 3, the Screen 40 is displaying an image of a graph. There is a larger darkened area 41 and a smaller darkened area 42, an unshaded area 43 occupying the remaining area of the Screen. A marker 44 indicates a position on the graph of the coordinate, pair generated by the Discriminate Process for a target.

In FIG. 3, the higher the marker along the ordinate, the more conductive is the detected target, the highest position indicating a relatively large object of highly conductive metal. The abscissa has an increasing value toward the left end of the Screen. A value of inductivity indicates the degree to which the target is magnetic or acts as an inductor. Generally speaking, the detection of ferrous, that is magnetic, materials causes the marker to move toward the left of the abscissa, while the detection of small, non-ferrous targets cause it to move toward the right. Different sets of current User Settings are capable of altering the degree of response of the marker to values of conductivity and inductivity.

The larger darkened area 41 and the smaller darkened area 42 indicate the sets of coordinates generated by targets that are regarded as undesirable by the operator. The Controls provide the operator the facility with which to alter the pattern of unshaded and darkened areas. Any pattern created can be stored as a member of the Discrim Pattern Library and recalled for use at some later time.

The program code that instructs the microprocessor to carry out the various processes is arranged such that the code for each process is separate from that of each other process and their individual positions within the memory map of the microprocessor are known. This makes it possible for the operator to replace any of the code groups for any of the Processes with a more suitable version, if one is available. Standardizing the software interfaces between processes facilitates this model.

Similarly, various libraries are located at known positions within the memory map of the microprocessor, or the digital memory connected to it, so entire libraries or individual elements of them can be replaced or added.

Figure 5:
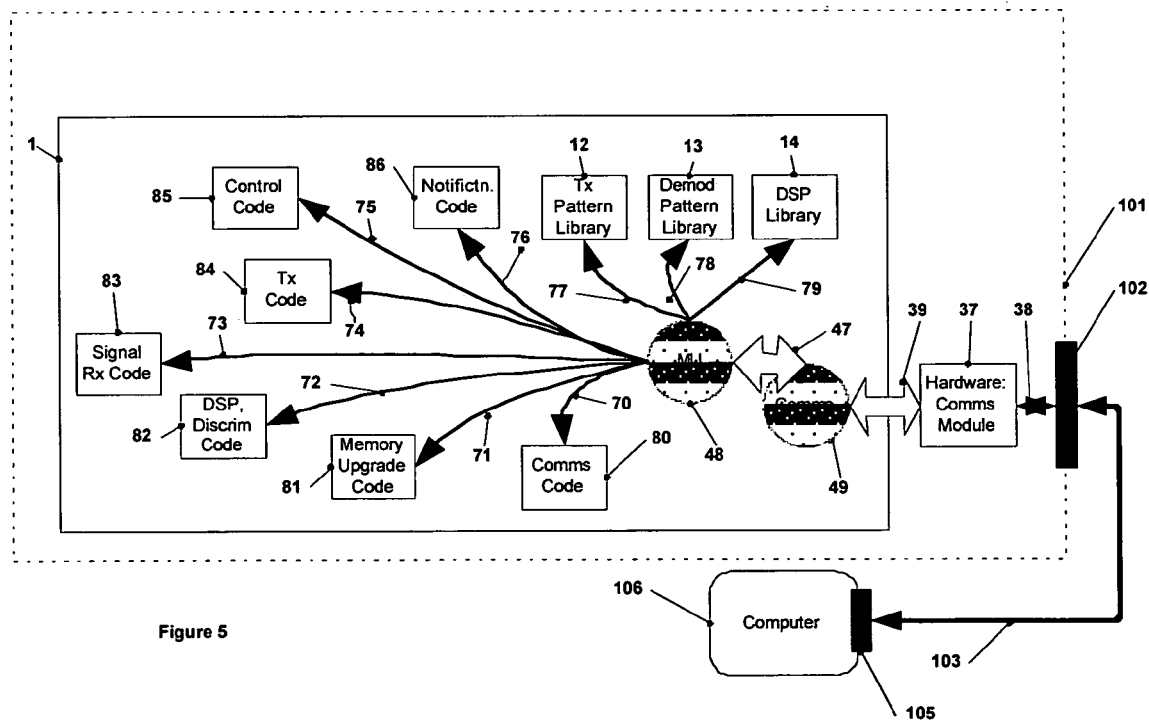
FIG. 5 shows a block diagrams of a detector made in accordance with the invention illustrating the blocks required for communication with a computer.

An overview of the system for transferring libraries and code is depicted in FIG. 5. In order to re-program any of the program or data modules present in the microprocessor, the detector is turned on with a suitable data connection between its data port and a data port of a computer 106 with access to a program for remotely programming the microprocessor and a copy of the code to be sent to the microprocessor and recorded in it.

A detector 101 has a communications port 102 in the housing of the detector, with intermediate electrical connections 38 to an electronic transceiver 37 which is connected to a port 39 of the microprocessor 1. A Comms Process 49 handles the communications with the electronic transceiver for the microprocessor and is able to exchange data with a memory upgrade MU Process 48 through a software programming connection 47. The MU Process is able to write data to the code blocks and libraries 80, 81, 82, 83, 84, 85, 86, 12, 13 and 14. In metal detectors of current art, the Transmit Patterns, Demodulation Patterns and DSP are fixed and cannot be changed by the user; some detectors might offer choices through switches, but the range of choice remains fixed. Those of current art with microprocessors have instructions programmed into them; they, too, cannot be changed by the operator. This allows the operator to alter attributes of the detector which are not user-alterable in prior art detectors.

Once the computer has its program running, it begins re-programming the microprocessor by sending it a preparatory command. In response, the microprocessor starts the MU Process, then switches itself into program mode, a state in which it is possible to write program data into the non-volatile memory of the microprocessor. Once this is done, it sends an acknowledgement to the computer, which then starts sending the program data to be stored in the microprocessor along with details of where they are to be stored. If the program data are encrypted, the MU Process must be able to reverse the encryption.

As the program data are received by the MU Process, they are stored in a buffer, usually of volatile memory, within the microprocessor. The MU Process also calculates an error checksum. When the computer has finished sending the program data, it causes its own calculation of the error checksum to be compared with that of the microprocessor. If the results are the same, the program data in the buffer are recorded in the non-volatile memory of the microprocessor at the location indicated earlier in the communications from the computer. Once that is done, the MU Process will reset the microprocessor, causing a general re-start of the detector.

If the two checksum calculations differ, the program data stored in the buffer are not recorded in the non-volatile memory of the microprocessor. Instead, the MU Process informs the computer of the error, essentially requesting that the computer send the program data again.

As the diagram of FIG. 5 shows, the flow of program data between the MU Process and the code modules is entirely uni-directional—the process can change the code modules but cannot read their current contents. Microprocessors often have read protection, preventing the reading of any data recorded in their non-volatile memories. This is to avert reverse engineering of the detector. In order to be read by a device external to the microprocessor, data must be stored in memory that is not protected in this manner.

Some such unprotected memory is included in the detector. It is this unprotected, non-volatile memory R/W Memory that facilitates the ability of two such detectors to exchange data with each other.

Figure 6:
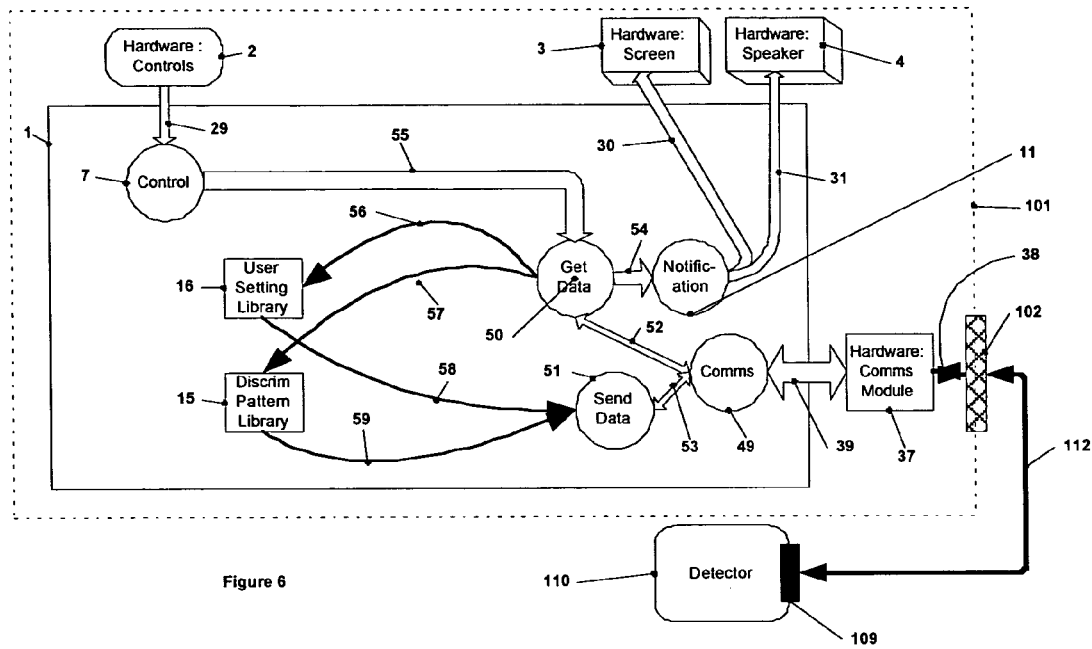
FIG. 6 shows a block diagram of a detector made in accordance with the invention illustrating the blocks required for communication with another detector also made in accordance with the invention.

FIG. 6 shows the Get Data Process 50 and the Send Data Process 51 within the microprocessor. The Send Data Process 53 exchanges data with the Comms Process and can read data from the User Setting Library and the Discrim Pattern Library. Thus, the Send Data Process is able to read elements of these libraries and have them transmitted to another detector or computer via the Comms Process, thence the connection to the Comms Module via the a port of the microprocessor and along the intermediate electrical connections.

The Get Data Process is able to record data in the User Setting Library and the Discrim Pattern Library. The operator is able to instruct the Get Data Process to request a particular set of parameters from within a particular library stored within the User Setting Library or the Discrim Pattern Library of the second detector. The operator is notified of progress of the transfer via the Screen and the Speaker. The Get Data Process is also connected to the Comms Process via a Get Data channel 52, enabling it to receive data from and send data to the second detector.

Figure 7:
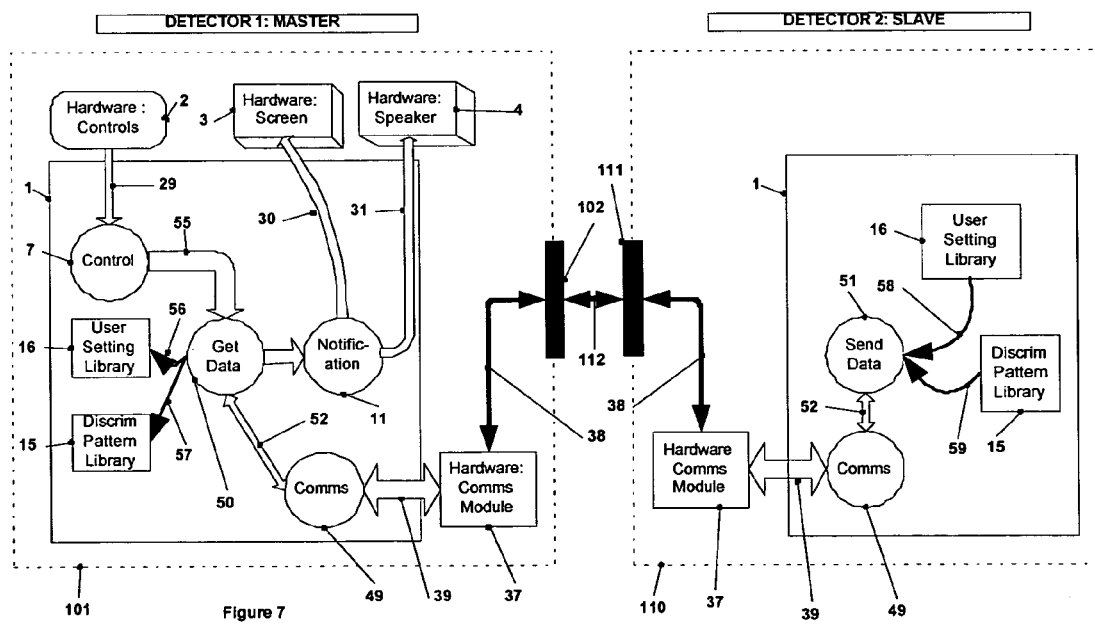
FIG. 7 is a block diagram of the software modules involved in the connection of two detectors each made in accordance with the invention.

The connection of two such detectors is shown in FIG. 7. The first detector, 400, is manipulated by the operator in order to get it to extract data from the libraries available from the second detector, 401. In the first detector, the Control Process informs the Get Data Process as to what element the operator desires from the second detector. The Get Data Process sends instructions for the Send Data Process of the second detector through the various communications connections and processes.

Upon receipt of these instructions, the Send Data Process within the second detector reads the required data from one of the libraries of the second detector, then has it sent to the first detector. The Get Data Process of the first detector receives these data and notifies the operator of the first detector that it has done so. The operator can then instruct the first detector to save the data in the usual manner, as well as have the user setting or discrimination pattern set to the values of the data.

Throughout this specification the purpose has been to illustrate the invention and not to limit this.

The invention claimed is:

1. A metal detector adapted to generate a transmit search signal and to receive a receive search signal, and to analyse such received search signal,
    wherein the detector is adapted to allow a selection of operating parameters for said receipt and analysis, said selection being effected by storage of data in a memory,
    characterised in that the detectoris adapted to allow such stored data to be modified to align with stored data in an external store, wherein the external store is a memory which is both outside of and spaced from the metal detector, and also from the memory within the metal detector which stores the data effecting the operating parameters;
    further comprising a digital data communication program, adapted to effect a transmission of some or all of the stored data through a data transmission link, thereby enabling a further metal detector to receive and store, for use in such further detector, said data,
    and wherein the operating parameters to be selected include a discrimination pattern, said discrimination pattern including at least one range of amplitude of a conductance component of a receive search signal and at least one range of amplitude of an inductive component of a receive search signal.

2. A metal detector as in claim 1 wherein the stored data can be replaced, either wholly or partially.

3. A metal detector as m claim 1 wherein the operating parameters to be selected include a transmit pattern.

4. A metal detector as in claim 1 wherein the operating parameters to be selected include a demodulation pattern.

5. A metal detector as in claim 1 wherein the operating parameters to be selected include filters and filter coefficients to be used for a digital signal processing operation to be applied to the receive search signal.

6. A metal detector as in claim 1 wherein the operating parameters to be selected include an information set indicating the values of any or all user modifiable settings of the detector.

7. A metal detector as in claim 1 adapted to allow a user to manually set and to record settings defining both at least one range of conductance and at least one range of reactance and record such setting range or ranges as a defined set.

8. A metal detector as in claim 1 wherein the detector is adapted to communicate stored data from the external store via an electronic transmission link, the electronic transmission link including a detachable wired connection leading from the exterior of the metal detector to the external store.

9. A metal detector as in claim 1 wherein the detector is adapted to communicate stored data from the external store via an electronic transmission link, the electronic transmission link including a wireless connection transmitting through space between the metal detector and the external store.

10. A method for operating ametal detector of a type which includes the ability to select values of operating parameters and to store such values as data, the method including the steps of:
   a. receiving operating parameter data via an electronic transmission link from a data source external to the metal detector, the operating parameter data being a set of values of operating parameters,
   b. storing the operating parameter data in an electronic memory within the metal detector, and
   c. modifying the operating parameters of the metal detector to conform to the set of values of operating parameters specified by the operating parameter data,
   wherein the electronic transmission link includes a wireless connection transmitting through space between the metal detector and the external data source.

11. A method for operating a metal detector as in claim 10 wherein the data are received from another detector of the same or similar type.

12. A method for operating a metal detector as in claim 10 wherein the data are received from a computer.

13. A method for operating a metal detector as in claim 12 wherein the computer receives the data by download from a remote computer system by way of a network of computers.

14. A method for operating a metal detector as in claim 10 wherein the electronic transmission link includes a detachable wired connection leading from the exterior of the metal detector to the external data source.

15. A method for operating a metal detector as in claim 10 wherein the operating parameters include one or more of:
   a. filters to be applied to a receive search signal;
   b. an amplitude range of a conductance component of a receive search signal;
   c. an amplitude range of an inductive component of a receive search signal; and
   d. an information set indicating the values of one or more user modifiable settings of the detector.

16. A set of two metal detectors of a type which includes the facility to select values of operating parameters and to store soch values as data, the set including
   a. a first metal detector adapted to store data values in first electronic memory, the data values representing parameters used to determine a search strategy used by said first detector to maximize the likelihood of detection of a selected target, and to effect the transfer of said data values over an electronic data transmission link, and
   b. a second metal detector adapted to receive data values over the electronic data transmission link, and to store said data values into an second electronic memory, the second metal detector being further adapted to use said data values to effect a search strategy to maximize the likelihood of detection of the same selected target.

17. A set of two metal detectors as in claim 16 wherein the electronic transmission link includes at least one of:
   a. a wired connection leaning from the first metal detector to the second metal detector, and
   b. a wireless connection transmitting though space between the metal detector and the external store.

* * * * *